United States Patent                                            [11] 3,624,109

[72] Inventors Enrico J. Pepe
              Kenmore;
              Bernard Kanner, Tonawanda, both of N.Y.
[21] Appl. No. 643,771
[22] Filed     Apr. 6, 1967
[45] Patented  Nov. 30, 1971
[73] Assignee  Union Carbide Corporation
              Original application Oct. 3, 1963, Ser. No.
              313,418, now Patent No. 3,334,121.
              Divided and this application Apr. 6, 1967,
              Ser. No. 643,771

[54] EPOXYORGANOFLUOROSILANES AND AMINO-
     HYDROXY DERIVATIVES THEREOF
     4 Claims, No Drawings
[52] U.S. Cl..................................................260/348 SC,
              260/448.2 B, 117/72, 117/126 GE, 117/126
                                           GS, 117/126 GN
[51] Int. Cl......................................................... C07f 7/12

[50] Field of Search............................................ 260/448.2
                                                        B, 348 SC; 117/72

[56]                    References Cited
                    UNITED STATES PATENTS
2,946,701   7/1960   Plueddemann...............        117/72
3,128,297   4/1964   Kanner et al. ...............      260/448.2
3,227,675   1/1966   Papalos........................    260/41
3,398,210   8/1968   Plueddemann et al. ......         260/448.2
                       FOREIGN PATENTS
1,061,321   7/1959   Germany.......................    260/348

Primary Examiner—Norma S. Milestone
Attorneys—Paul A. Rose, Thomas I. O'Brien, Eugene C.
     Trautlein and Harrie M. Humphreys ABSTRACT: The invention characterizes novel epoxy organo fluoro silanes wherein the fluorine is directly bonded to silicon.

EPOXYORGANOFLUOROSILANES AND AMINO-HYDROXY DERIVATIVES THEREOF

This application is a division of application Ser. No. 313,418, filed Oct. 3, 1963, now U.S. Pat. No. 3,334,121.

This invention relates to organosilicon compounds. More particularly, the invention is directed to a new and useful class of epoxyorganofluorosilanes and to certain aminohydroxy derivatives of these epoxyorganofluorosilanes.

The epoxyorganofluorosilanes of this invention are represented by the formula (A) 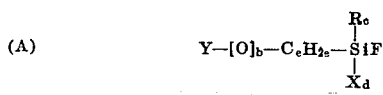

wherein Y is a monovalent hydrocarbon group free of aliphatic unsaturation and containing an oxirane ring; R is a monovalent hydrocarbon group free of aliphatic unsaturation; X is fluorine or a hydrocarbyloxy group —OR; $b$ is an integer having a value from zero to 1; $c$ is an integer having a value from 1 to 2; $d$ is an integer having a value from zero to 1; the sum of $c$ and $d$ carbon is 2; when $b$ is zero then $e$ is an integer having a value from 1 to about 6, and when $b$ is 1 then (i) $e$ is an integer having a value from 2 to about 6 and the oxygen atom is separated from silicon by at least two carbon atoms of the $C_eH_{2e}$ group and (ii) the oxirane ring in the Y group is separated from the oxygen atom by at least one carbon atom.

The monovalent Y group contains carbon, hydrogen and an oxirane ring having the structure

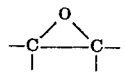

Preferably the Y group contains from three to about ten carbon atoms. Illustrative of the Y groups are the following:

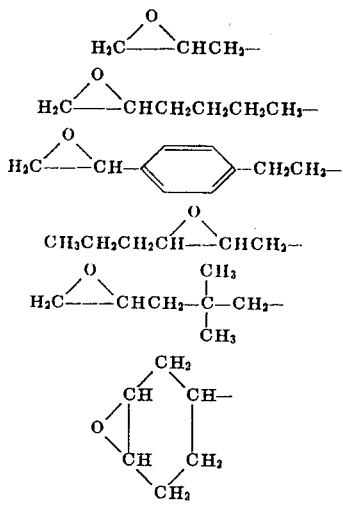

and the like.

The monovalent hydrocarbon group R, when bonded directly to silicon or when forming part of a hydrocarbyloxy group OR, is preferably one containing from one to about ten carbon atoms, for example, an alkyl, cycloalkyl aryl, alkaryl or aralkyl group such as methyl, ethyl, isobutyl, hexyl, 2-ethylhexyl, cyclopentyl, 2-ethylcyclohexyl, phenyl, tolyl, mesityl, cumyl, beta-phenylethyl, naphthyl, and the like.

Illustrative of the compounds of this invention as represented by formula A are the following:

(a) 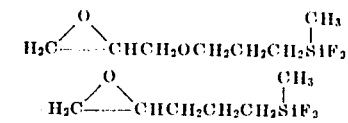

(b) 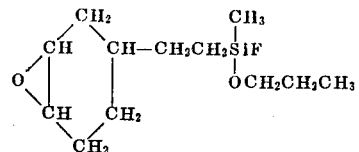

(c) 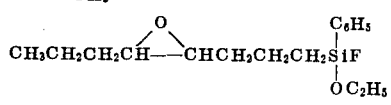

(d) 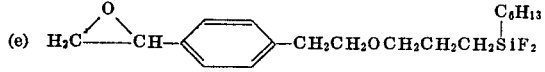

(e) 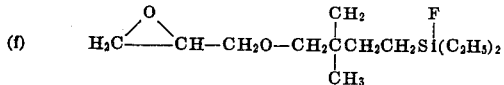

(f) 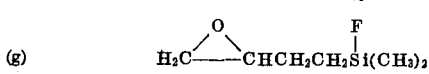

(g) 

and the like

As used herein, $C_6H_5$, $C_6H_{13}$ and $C_2H_5$ represent the phenyl, n-hexyl and ethyl groups, respectively.

The stability of the compounds of formula A is unexpected in view of the known reactivity of siliconhalogen bonds with oxirane rings. See for example, "Organosilicon Compounds" by C. Eaborn, Academic Press, New York, 1960, pp. 299–300.

The epoxyorganofluorosilanes of this invention (compounds of formula A) can be produced by a process which comprises the reaction in the presence of a platinum catalyst of (1) a silane represented by the formula (B) 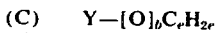

wherein R, X, $c$ and $d$ have the meanings defined hereinabove with reference to formula A, and 2) an organic epoxide containing a carbon-carbon double bond and represented by the formula (C)    $Y—[O]_bC_eH_{2e}$ wherein Y, $b$ and $e$ have the meanings defined hereinabove with reference to formula A and when $b$ is 1 the carbon-carbon double bond is in the $C_eH_{2e}$ moiety.

Illustrative of the silanes represented by formula B are

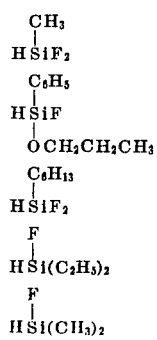

and the like.

The compounds of formula B wherein X is fluorine can be prepared by the reaction of chlorosilanes well known in the art and represented by the formula (D) 

wherein R and c have the meanings defined hereinabove with reference to formula A, f is an integer having a value from 1 to 2, and the sum of c and f is 3, with aqueous hydrofluoric acid and recovering as a product the fluorosilane of formula B wherein X is fluorine. For example, methyldifluorosilane can be prepared by mixing methyldichlorosilane and hydrofluoric acid and separating methyldifluorosilane from the reaction mixture by fractional distillation.

The compounds of formula B wherein X is a hydrocarbyloxy group (—OR) can be prepared by the reaction of the corresponding compound of formula B wherein X is fluorine with a relatively low boiling hydrocarbyloxy silane, preferably a tetraalkylsilicate or methyltrialkoxysilane. This process is conveniently carried out by mixing a compound of formula B, wherein X is fluorine, with a hydrocarbyloxy silane and heating the mixture at a temperature between 20° C. and 200° C. until redistribution of one of the silicon bonded fluorine atoms with a silicon-bonded hydrocarbyloxy group has taken place. Under the above-described conditions only one of the two fluorine atoms attached to silicon will be replaced by a hydrocarbyloxy group. The redistribution reaction is generally completed within about 1 to 5 hours and the mixed fluorohydrocarbyloxy silane can be separated from the reaction mixture by fractional distillation. For example, methylfluoroethoxy silane can be prepared by mixing methyldifluorosilane and tetraethylsilicate, heating the mixture at its atmospheric pressure boiling point for about 2 hours, and separating methylfluoroethoxysilane from the reaction mixture by fractional distillation.

Illustrative of the unsaturated epoxy organic compounds of formula C are:

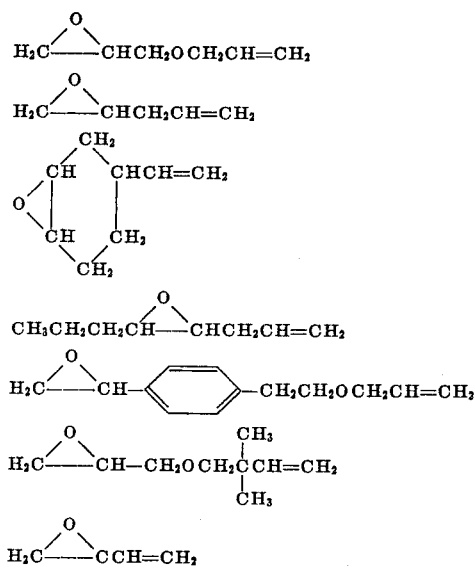

and the like.

The compounds of formula C are well known in the art and can be prepared by conventional methods.

The silane of formula B and the unsaturated epoxy organic compound of formula C can be caused to react to produce the silanes of formula A by heating a mixture thereof with a platinum catalyst at a temperature between about 20° C. and 150° C. for about 1 hour to 48 hours or longer. Preferred reaction conditions are a temperature from 35° C. to 100° C. for from 1 hour to 24 hours. Where the silane of formula B is a gas, it can be bubbled into a mixture of the unsaturated epoxyorganic compound of formula C and the platinum catalyst.

It is desirable to employ stoichiometric amounts of the reactants, although up to a 100 percent stoichiometic excess of either reactant can be used.

Although other than the above-described reaction temperatures, reactant ratios and reaction times can be employed, no significant advantage is achieved thereby.

The use of an inert solvent in the process for preparing the compounds of formula A is not necessary but is often desirable in helping to dissipate heat liberated by the exothermic reaction of the compounds of formula B with compounds of formula C. Illustrative organic solvents which can be used if desired are aromatic hydrocarbons such as benzene, toluene, xylene, cumene, and tetrahydronaphthalene, aliphatic hydrocarbons such as heptane, octane and petroleum ether, and ethers such as diethyl ether, dibutyl ether, dioxane, tetrahydrofuran, ethylene glycol dimethyl ether and diethylene glycol dimethyl ether, and the like.

Where a solvent is employed a convenient reaction temperature is the normal boiling point of the solvent—reactant mixture.

Platinum catalysts that are useful in the process for producing compounds of formula A include platinum metal and platinum compounds such as chloroplatinic acid and tetraamine platinous chloride, $Pt(NH_3)_4Cl_2$. Where platinum metal is employed as a catalyst it can be used alone in a finely divided form or supported on a solid substrate such as charcoal or gamma-alumina. When a platinum compound is used as the catalyst it can be used alone or dissolved in an inert solvent such as ethanol. When platinum metal on a solid support is employed as the catalyst it is preferable to agitate the reaction mixture.

The amount of platinum catalyst employed can vary from about one part per million to 200 parts per million or greater based on the total weight of the silane of formula B and unsaturated epoxy organic compound of formula C. The preferred amount of catalyst is about one to about 20 parts per million.

The epoxyorganofluorosilane product can be recovered from the reaction mixture by conventional procedures, generally by fractional distillation at atmospheric or reduced pressure.

The amino-hydroxy-organofluorosilanes of this invention are represented by the formula (D) 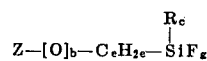

wherein Z is a monovalent hydrocarbon group free of aliphatic unsaturation and containing the unit

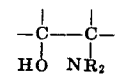

; R is a monovalent hydrocarbon group free of aliphatic unsaturation; b is an integer having a value from zero to 1; c is an integer having a value from 1 to 2; g is an integer having a value from 1 to 2; the sum of c and g is 3; when b is zero, then e is an integer having a value from 1 to about 6, and when b is 1 then (i) is an integer having a value from 2 to about 6 and the oxygen atom is separated from silicon by at least two carbon atoms of the $C_eH_{2e}$ group and (ii) the —OH substituent in the Z group is separated from the oxygen atom by at least two carbon atoms.

Thus the compounds of formula D are the derivatives obtained by the reaction of a secondary amine, $R_2NH$, with the epoxy group of a compound of formula A, X in formula A being fluorine.

The monovalent group Z contains carbon, hydrogen and the unit

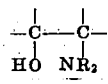

. Preferably the Z group contains from three to about ten carbon atoms, exclusive of carbon atoms present in the $-NR_2$ substituent.

Illustrative of the Z groups are the following:

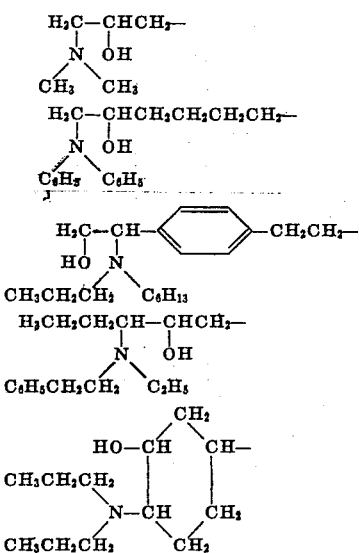

The monovalent hydrocarbon group R preferably contains from one to about ten carbon atoms and is identical in structure with the group R as defined with reference to formula A hereinabove.

The stability of the compounds of formula D is unexpected in view of the known reactivity of hydroxy compounds with silicon-bonded halogen atoms, particularly in the presence of halogen halide acceptors. See for example "Organosilicon Compounds" by C Eaborn, Academic Press, New York, 1960, pages 288–293.

The compounds of formula D can be produced by a process which comprises the reaction of an epoxyorganofluorosilane of formula A hereinabove, where X is fluorine, with a secondary amine represented by the formula $R_2NH$, wherein R has the meaning defined hereinabove. The The nitrogen-hydrogen bond in the secondary amine reacts with the oxirane ring of the epoxy-organofluorosilane to produce a grouping having a configuration

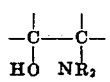

The addition reaction of the secondary amine and the epoxy-organofluorosilane generally produces a mixture of the two possible isomers. However when (1) the oxirane ring is in a terminal position in the Y group, that is when the epoxy group has the structure

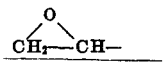

, and (2) the oxirane ring is not directly bonded to an aromatic ring, the principal reaction product is the isomer having the structure

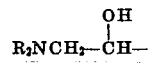

, and only relatively small amounts of the other isomer are obtained.

The reaction of the epoxyorganofluorosilane and the secondary amine can be carried out by mixing the reactants and heating the mixture at a temperature between 25° C. and 150° C. for about 1 to about 5 hours. The compound of formula D can then be separated from the reaction mixture by fractional distillation. The mole ratio of secondary amine to epoxyorganofluorosilane can vary from about 1:1 to about 3:1. The reaction is preferably carried out under anhydrous conditions.

Relatively lower reaction temperatures are required when the starting epoxyorganofluorosilane of formula A is one in which b is one. When b is zero in the compound of formula A, relatively higher reaction temperatures are required.

An inert solvent is generally not required in the reaction of the secondary amine with the epoxyorganofluorosilane. However, the illustrative inert solvents described hereinabove (with reference to the reaction of compounds of formula B with compounds of formula C) can be used if desired.

The reaction of the secondary amine with the oxirane ring of the compound of formula A is accelerated by adding to the reaction mixture a small amount (less than one weight percent) of an organic hydroxy compound, preferably an alkanol such as ethanol, isopropanol or butanol.

Illustrative of the secondary amines which can be used in the precess for producing compounds of formula D are:

(a')            $HN(C_2H_5)_2$ (b')            $HN(C_6H_5)_2$ (c')

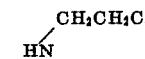

(d')

(e')

(f')            $HN[CH(CH_3)_2]_2$ (g')

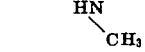

, and the like

The reaction of epoxyorganofluorosilanes (a), (b), (e), (f) and (g) hereinabove with, respectively, secondary amines (a'), (b'), (e'), (f') and (g') hereinabove yields, respectively, the following illustrative compounds of formula D:

(a-a')
$$(C_2H_5)_2N-CH_2\overset{OH}{\underset{|}{C}H}CH_2O(CH_2)_3\overset{CH_3}{\underset{|}{S}i}F_2$$

(b-b')
$$(C_6H_5)_2N-CH_2-\overset{OH}{\underset{|}{C}H}(CH_2)_3\overset{CH_3}{\underset{|}{S}i}F_2$$

(e-e')

and

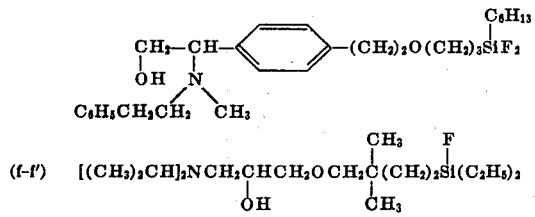

(f-f')  [(CH₃)₂CH]₂NCH₂CHCH₂OCH₂C(CH₃)₂Si(C₂H₅)₂
                      |        |
                      OH      CH₃

(g-g')
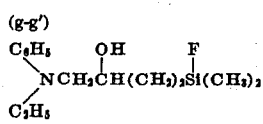

Similarly the reaction of

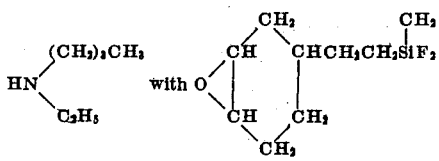

produces a mixture of compounds of formula D, namely

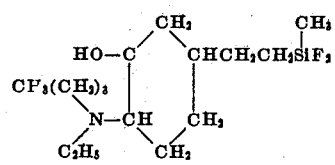

and

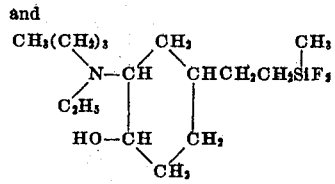

and the reaction of

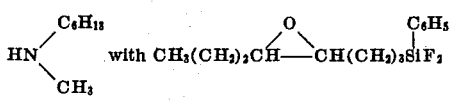

gives a mixture of compounds of formula D, namely:

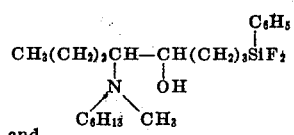

and

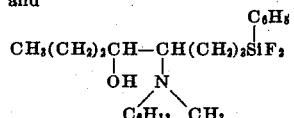

The epoxy-organofluorosilanes of this invention and the derivatives produced by the reaction of secondary amines therewith are useful as sizing and finishing agents for glass fibers. For example, compounds of formula A or of formula D can be employed as sizes for glass roving or yarn in order to reduce damage to the fibers caused by the fibers rubbing against each other. Also, the compounds of formula A or formula D can be used as finishes for glass cloth where the glass cloth is used in conjunction with thermosetting organic resins to produce composite articles.

Glass cloth or fibers can be finished with compounds of formulas A or D by applying a finishing solution containing the compounds to the cloth or fibers and evaporating the solvent. Useful solvents include, for example, the aliphatic oxygen-containing compounds such as the alkanols and the ether-alkanols, examples of which include ethanol, propanol, methoxyethanol, ethoxyethanol, and the like, and the aromatic hydrocarbons such as benzene, toluene, xylene and the like. The preferred solvents are those nonflammable solvents such as water and those aqueous organic admixtures in which the organic constituent is a solvent for, but nonreactive with, the silane of formula A or D and miscible with sufficient water as to provide a homogeneous mixture therewith. The aqueous organic admixtures can contain, for example, from zero to about 60 parts water and from 100 to 40 parts of an aliphatic oxygen-containing organic compound such as ethanol. Mixtures containing 33 parts by weight of water and 67 parts by weight of an alcohol (such as methanol or ethanol) are particularly useful solvents in these finishing solutions. The finishing solution can contain from 0.2 part to 5 parts or more by weight of a silane of formulas A or D per 100 parts by weight of the solvent but preferably the solution contains from 1.5 parts by weight of the silane per 100 parts by weight of the solution.

When in aqueous solution the silicon-bonded fluorine atoms and/or silicon-bonded hydrocarbyloxy groups of the silanes of formulas A or D hydrolyze at a slow rate and, should such solutions be allowed to stand for a sufficiently long period, the silanes are converted to the corresponding polysiloxanes by hydrolysis and condensation. Admixtures of such polysiloxanes with aqueous organic compounds or with water can be employed as sizes for glass fiber rovings or finishes for glass cloth. Thus, fibrous glass, glass cloth and the like which has been treated with such solutions of the silanes of formulas A or D is sized or finished with the hydrolysis products of these novel organofluorosilanes.

Finishing solutions containing the compounds of formulas A or D can be applied to glass cloth by any suitable means (e.g., by spraying or brushing the solution on the cloth). Preferably, the column is applied to the cloth by immersing the cloth in the solution and then out the excess solution by passing the cloth through squeeze rolls. After the finishing solution is applied to the cloth, the solvent can be volatilized by air drying the cloth at room temperature. Alternately the fibers can be heated from 100° C. to 200° C. for one to ten minutes to promote the volatilization of the solvent in less time than is required for air drying.

Laminated products can be produced from glass cloth that is finished with compounds of formulas A or D by standard procedures. These laminates comprise a unitary structure of multiple plies of finished glass cloth bonded together by an organic resin which has been thermoset by the application of heat. Thus, a layer of finished cloth can be coated or impregnated with a thermosetting organic resin and the process repeated until an intermediate product of the desired thickness composed of multiple layers of resin-impregnated cloth is produced. The intermediate product can be converted to or cured to produce a bonded, unitary laminate by heating the intermediate product at a cure temperature from room temperature to about 210° C. The particular cure temperature and cure time employed can vary somewhat depending upon the type of thermosetting organic resin being used. The curing can be conducted while subjecting the intermediate product to pressure in a suitable apparatus (e.g., in a hydraulic press).

Thermosetting organic resins that are suitable for use in producing laminated products with glass cloth that is finished with the compounds of formulas A or D include melamine (melamine-aldehyde) resins, epoxy resins, phenolic (phenol-aldehyde) resins, and polyester resins. Suitable thermosetting resins include the phenol-formaldehyde resins, the phenol-acetaldehyde resins, the phenol-furfural resins, the cresol-formaldehyde resins, and the melamine-formaldehyde resins. Also of considerable interest are the epoxy resins which comprise the diglycidyl ethers of polyhydric phenols (or polyhydric aliphatic alcohols) as well as blends of such diglycidyl ethers of polyhydric phenols with such modifying ingredients as the polyphenol compounds.

The chemical nature and physical properties of these common laminating resins and the use of these resins in the production of glass cloth laminates are well known and understood by persons skilled in the field of resin laminates. See for example, "Plastics Engineering Handbook," Reinhold Publishing Corp., New York, 1954, Chapter 6 and R. H. Sonneborn, "Fiberglas Reinforced Plastics," Reinhold Publishing Corp., New York, 1954.

The following illustrative examples are presented. In the examples, "b.p." represents boiling point (at one atmosphere pressure unless otherwise indicated). "$n_D^{25}$" represents refractive index at 25° C. With reference to the sodium "D" line, "mm. Hg" is the pressure in millimeters of mercury, and "NE" represents neutralization equivalent.

EXAMPLE 1

Into a 1-liter, three-necked flask fitted with magnetic stirring bar, solid carbon dioxide condenser, gas inlet tube and thermometer was charged 114 g. (1.0 moles) of allyl glycidyl ether dissolved in 200 g. of dry tetrahydrofuran and 0.5 g. of a chloroplatinic acid solution in ethylene glycol dimethyl ether containing 0.0143 g. Pt/g. of solution (calculated to be 20 p.p.m. Pt). Purified gaseous $CH_3SiHF_2$, 82 g. (1 mole), was introduced over 0.5 hour with stirring at room temperature. The reaction was exothermic during the first third of addition to about 35° C. Heat was applied to keep the mixture at 45° to 55° C. for the balance of the addition. Upon completion of the addition, the mixture was stirred 15 minutes and fractionally distilled through a two-foot Vigreaux column to give 25 g. of recovered allyl glycidyl ether (22 percent recovery) and 101 g. of crude gamma-glycidoxypropylmethylidifuorosilane: b.p. 52°/0.3 mm. Hg—56°/0.4 mm. Hg, $n_D^{25}$ 1.4068, NE–206 (196.2 calc.).

Fractional distillation of the crude product through a 8–10 plate column isolated purified

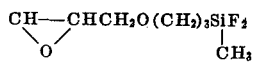

in 50 mole per cent yield: b.p. 103°mm. Hg, $N_D^{25}$ 1.4029.

*Analysis.*—Calc. for $C_7H_{14}SiO_2F_2$ (percent): 42.7 C, 7.2 H, 14.3 Si, 19.4 F, 196.2 N.E. Found (percent) 42.9 C, 7.3 H, 14.0 Si, 18.0 F, 201±5 N.E.

The identity of the product was further confirmed by infrared spectrographic analysis.

EXAMPLE 2

Following the procedures of Example 1, methyldifluorosilane is introduced into a stirred mixture comprising 1,2-epoxy-4-pentene dissolved in tetrahydrofuran with platinum on gamma-alumina catalyst suspended in the solution. The reaction mixture is then fractionally distilled to yield

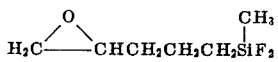

as the the principal product.

EXAMPLE 3

Into a 1-liter, three-necked flask fitted with magnetic stirrer, solid carbon dioxide condenser, thermometer and gas inlet tube connected to a tared reservoir of methyldifluorosilane was charged 100 g. (0.8 mole) of redistilled vinyl-cyclohexene monoepoxide, 200 ml. of dried tetrahydrofuran and 6–7 p.p.m. Pt (added as a solution of chloroplatinic acid in ethylene glycol dimethyl ether). Taking care to exclude moisture, methyldifluorosilane was evaporated into the system at room temperature over a 1.25 hour period, the reaction mixture being held below 57° C. The colorless reaction mixture was fractionally distilled through a two-foot Vigreaux column to give 26 g. of recovered starting olefin and 79 g. of crude epoxyorganofluorosilane product: b.p. 54°/0.1 mm. Hg—62°/0.3 mm. Hg, $n_D^{25}$ 1.4351, NE–236–253.

Fractional distillation of the crude product through a 1-foot high packed column gave 65.3 g. (40 mole-percent yield) of purified

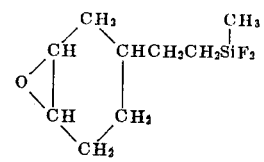

EXAMPLE 4

Into a 500 ml. distillation flask fitted with condenser, drying tube, thermometer and heating mantle was charged 90 g. (0.45 moles) of gamma-glycidoxypropylmethyldifluorosilane

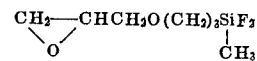

(2.0 moles) of dried diisopropylamine and 2 drops of ethanol. The mixture was heated for 64 hours at 85°–90° C., cooled to 10° C. and filtered. The filtrate was fractionally distilled to give 40.5 g. (.136 moles) of

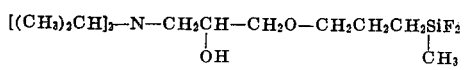

b.p. 77° C./.02 mm. Hg—97° C./.10 mm. Hg, $n_D^{25}$—1.4422, a 30 mole percent yield:

The identity of the product was confirmed by elemental and infrared spectrographic analysis.

Results of elemental analysis:

Calc. for $C_{13}H_{29}SiO_2NF_2$ (percent): 52.5 C, 9.8 H, 9.4 Si, 4.7 N, 297.6 N.E. Found: 53.4 C, 9.6 H, 9.1 Si, 4.6 N, 298 N.E.

What is claimed is:
1. Epoxyorganofluorosilanes represented by the formula

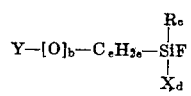

wherein Y is a substituted monovalent hydrocarbon group free of aliphatic unsaturation in which said substitution is an oxirane ring, and having from three to about ten carbon atoms; R is a monovalent hydrocarbon group free of aliphatic unsaturation and having from one to about ten carbon atoms; X is selected from the class consisting of fluorine and hydrocarbyloxy groups —OR; $b$ is an integer having a value from zero to 1; $c$ is an integer having a value from 1 to 2; $d$ is an integer having a value from zero to 1; the sum of $c$ and $d$ is 2; when $b$ is zero then $e$ is an integer having a value from 1 to about 6, and when $b$ is 1 then (i) $e$ is an integer having a value from 2 to about 6 and the oxygen atom is separated from silicon by at least two carbon atoms of the $C_eH_{2e}$ group and (ii) the oxirane ring in the Y group is separated from the oxygen atom by at least one carbon atom.

2. The epoxyorganofluorosilanes in accordance with claim 1 wherein R is the methyl group, X is fluorine, $c$ is 1 and $d$ is 1.

3. The compound represented by the formula

4. The compound represented by the formula
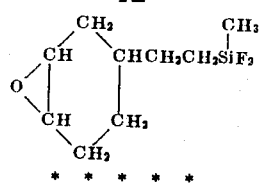

UNITED STATES PATENT OFFICE
CERTIFICATE OF CORRECTION

Patent No. 3,624,109          Dated November 13, 1971

Inventor(s) Enrico J. Pepe et al

It is certified that error appears in the above-identified patent and that said Letters Patent are hereby corrected as shown below:

| | | |
|---|---|---|
| Column 1, line 23; | | After "d" delete --carbon-- |
| Column 3, first formula; | | "$Cl_1$" should read --$Cl_f$-- |
| Column 5, line 31; | | "$H_3CH_2-CH_2CH-CH-CH_2-$" should read --$CH_3CH_2CH_2-CH-CH-CH_2-$ -- |
| Column 5, line 60; | | Delete second appearing --The-- |
| Column 8, line 40, | | "column" should read --solution-- |
| | line 41; | After "then" insert --squeezing-- |
| Column 9, line 45; | | "103°mm" should read --103°/17mm-- |

Signed and sealed this 17th day of September 1974.

(SEAL)
Attest:

McCOY M. GIBSON JR.
Attesting Officer

C. MARSHALL DANN
Commissioner of Patents